United States Patent
Higuchi

(10) Patent No.: US 6,529,388 B2
(45) Date of Patent: Mar. 4, 2003

(54) HIGH VOLTAGE GENERATING APPARATUS FOR USE IN TONER SYSTEM PRINTING DEVICE

(75) Inventor: Yoshio Higuchi, Osaka (JP)

(73) Assignee: Funai Electric Co., Ltd., Daito (JP)

( * ) Notice: Subject to any disclaimer, the term of this patent is extended or adjusted under 35 U.S.C. 154(b) by 0 days.

(21) Appl. No.: 09/972,367

(22) Filed: Oct. 5, 2001

(65) Prior Publication Data

US 2002/0051369 A1 May 2, 2002

(30) Foreign Application Priority Data

Oct. 27, 2000 (JP) .................................. 2000-007726 U

(51) Int. Cl.⁷ ............................................ H02M 3/335
(52) U.S. Cl. ....................... 363/19; 363/21.07; 399/66
(58) Field of Search .......................... 363/16, 21.07, 363/97, 95, 98, 19; 323/282, 284, 285; 399/66, 88, 313, 314; 355/277

(56) References Cited

U.S. PATENT DOCUMENTS 5,682,575 A * 10/1997 Komori ...................... 399/66
5,917,713 A *  6/1999 Higuchi ...................... 363/19

FOREIGN PATENT DOCUMENTS

| JP | A-62-058874 | 3/1987 |
| JP | A-05-049257 | 2/1993 |
| JP | A-05-064443 | 3/1993 |
| JP | A-05-304770 | 11/1993 |
| JP | A-63-128368 | 5/1998 |

OTHER PUBLICATIONS

Patent Abstracts of Japan, publication No. 62–058874, dated Mar. 14, 1987.
Patent Abstracts of Japan, publication No. 05–049257, dated Feb. 26, 1993.

* cited by examiner

Primary Examiner—Rajnikant B. Patel
(74) Attorney, Agent, or Firm—Rosenthal & Osha L.L.P.

(57) ABSTRACT

In a configuration which is provided with a voltage control circuit 2 for supplying a DC voltage control signal created on the basis of the voltage detecting signal 44 to an terminal of an auxiliary coil L3, wherein the voltage control circuit 2 controls the oscillating amplitude of a transistor Q1 for oscillation using the voltage control signal to stabilize the voltage of the secondary output, and the secondary output is led to a high voltage applying portion of a toner system printing section, a detecting signal creating circuit 5 rectifies the output from the voltage detecting coil L4 at the same timing as the rectifying/smoothing circuit rectifies the output from the secondary coil L2.

4 Claims, 3 Drawing Sheets

HIGH VOLTAGE GENERATING APPARATUS FOR USE IN TONER SYSTEM PRINTING DEVICE

BACKGROUND OF THE INVENTION

1. Technical Field

This invention relates to a toner system printing device which performs toners such as a printer or copier, and more particularly to a high voltage generating circuit for a high voltage required for toner system printing.

2. Related Art

In a toner-system printing apparatus such as a laser-printer or copier, toners deposited on a photosensitive drum are duplicated on a printing sheet of paper using a duplicating roller. For this purpose, a high voltage is applied to the duplicating roller. This high voltage is required to be variable in a wide range of −1300 V to +2700 V.

FIG. 4 shows a prior art high voltage generating apparatus satisfying the above requirement. This prior art apparatus includes high voltage generating circuits 81 and 82. The high voltage generating circuit 81 serves to vary a secondary output voltage continuously within a range of 700 V to 4700 V according to the duty ratio of a PWM signal 84. The high voltage generating circuit 82 serves to generate a stabilized voltage of about −2000 V. The secondary output of the high voltage generating circuit 82 and the secondary output of the high voltage generating circuit 81 are connected in series. Therefore, the voltage at a high voltage output 83 varies continuously within a range of −1300 V to +2700 V according to the duty ratio of the PWM signal 84.

The, above high voltage circuit will be explained below in detail. A transistor for oscillation (hereinafter simply referred to "transistor") Q81 with a collector connected to a primary coil L81 and a base connected to an auxiliary coil L83 carries out self-exited oscillation in a non-saturated range. A voltage control circuit 86 controls the oscillating amplitude of the transistor Q81 in such a manner that an output created on the basis of a signal 85 representative of a voltage on the secondary output is sent to the auxiliary coil L83. Therefore, the voltage of the secondary output is stabilized to a voltage represented by the duty ratio of the PWM signal 84 (this technique is referred to as a first prior art).

One of prior arts related to a switching power source is disclosed in the Unexamined Japanese Patent Application Publication No. Hei11-206116. In this technique, in order to limit a voltage from DC electric power to a voltage (second voltage value) or lower which is lower than a prescribed output voltage (first voltage value), a constant voltage control means is provided for feedback-controlling a switching means on the basis of an induced voltage from an auxiliary winding. The constant voltage control means takes out the induced voltage at the same timing as the timing when the output is taken out from the secondary winding. Therefore, an increase in the voltage from the DC electric power is detected as an increase in the induced voltage from the auxiliary winding. When the induced voltage is just about to exceed a prescribed value, the control of suppressing the increase in the voltage from the DC electric power is performed. Therefore, when the load is abruptly changed from its heavy state into an opened state, an increase in the voltage from the DC electric power is limited to the second voltage value (this technique is referred to the second prior art).

[Problems that the Invention is to Solve]

However, use of the first prior art presents the following problem. The transistor Q81 performs the self-excited oscillation within a non-saturated range. Therefore, the oscillating waveform at the collector at the transistor Q81 is a sine wave, but contains distortion. The ratio of distortion varies as hfe of the transistor Q81 varies. The ratio of distortion also varies when the voltage value at the secondary output and the load current value vary. In short, the ratio of distortion varies for different apparatus. Even with the same apparatus, it varies according its state of use. FIG. 2 shows an oscillating waveform containing the above distortion. Where the oscillating waveform contains such distortion, the voltage of the coil output rectified and smoothed over period t1 is higher than that rectified and smoothed over period t2.

On the other hand, the secondary output of the high voltage generating circuit 81 is the double-voltage rectified output from the secondary coil. Therefore, the voltage of the secondary output is a sum of the voltage rectified over the period t1 and the voltage rectified over the period t2. However, the signal 85 representative of the voltage of the secondary output is either one of the voltage rectified over the period t1 and the voltage rectified over the period t2. Therefore, where the voltage rectified over the period t1 is used as the signal 85, the voltage represented by the signal 85 is higher than an actual secondary output voltage. Thus, the voltage of the secondary output is controlled to be lower than the voltage directed by the PWM signal 84. On the other hand, the voltage rectified over the period t2 is used as the signal 85, an opposite state occurs. Namely, the voltage of the secondary output is controlled to be lower than the directed voltage. As a result, in either case where the voltage is rectified over the period t1 or t2, the accuracy of the voltage of the secondary output is deteriorated, thereby attenuating the printing quality of the portion printed using toners.

In order to obviate such inconvenience, it has been proposed to correct the deviation of the voltage represented by the signal 85 from an actual voltage of the secondary output with the aid of a variable resistor 87, thereby preventing deterioration in the voltage accuracy. However, as described above, the ratio of distortion in the oscillating waveform also varies according the state of use. Hence, the quantity of deviation also varies according to the state of use. This presents a problem that the correction by the variable resistor 87 does not always result in suitable correction. In addition, this also presents a problem that the step of adjusting the variable resistor 87 is required.

Meanwhile, in the second prior art, the element on the primary output performs a switching operation. Therefore, in order to take out the voltage corresponding to the voltage of the secondary output from the auxiliary winding, the output must be taken out from the auxiliary winding at the same timing as the output is taken out from the secondary output. Namely, this technique is defined by the theory of switching, but is not adopted for the purpose of increasing the detecting accuracy. Therefore, in a configuration in which since the transistor performs self-excited oscillation within the non-saturated range, the oscillating waveform can be regarded as a sine wave and the voltage corresponding to the secondary output can be taken out when either half-wave of the output sent from the coil is rectified, it is difficult to apply the second prior art to the purpose of increasing the voltage accuracy at the secondary output.

SUMMARY OF THE INVENTION

This invention has been accomplished in order to solve the problems described above. An object of this invention is to provide a high voltage generating apparatus for use in a toner-system printing device capable of improving a voltage accuracy at a secondary output in a configuration in which a transistor performs self-excited oscillation within a non-saturated range, thereby increasing printing quality. In this case, the voltage accuracy at the secondary output can be improved in such a manner that, as a voltage detected signal representative of a voltage of the secondary output, a signal is used which is obtained when the output from a voltage detecting coil is rectified and smoothed at the same timing as the output from a secondary coil is rectified and smoothed by a rectifying/smoothing circuit, thereby removing a bad influence from distortion of self-excited oscillation on the voltage accuracy at the secondary output.

In addition to the above object, another object of this invention is to provide a high voltage generating apparatus for use in a toner-system printing device having a configuration in which a transistor performs self-excited oscillation within a non-saturated range and a double-voltage rectifying circuit is used as the secondary output, thereby improving printing quality. In this case, the voltage accuracy at the secondary output can be improved in such a manner that, as a voltage detected signal representative of a voltage of the secondary output, a signal is used when the output from a voltage detecting coil is double-voltage rectified or full-wave rectified, thereby removing a bad influence from distortion of self-excited oscillation on the voltage accuracy at the secondary output.

In addition to the above objects, still another object of this invention is to provide a high voltage generating apparatus for use in a toner-system printing device, capable of preventing reduction in the voltage accuracy at a secondary output due to a change in a forward voltage of a rectifying element in such a manner that the ratio of the forward voltage of the rectifying element for rectifying an output from a secondary coil to that of the rectifying element for rectifying an output from a voltage detecting coil and the ratio of the number of turns of the secondary coil to that of the voltage detecting coil are approximate values to each other.

In addition to the above objects, a further object of this invention is to provide a high voltage generating apparatus for use in a toner-system printing device, capable of improving the accuracy of an output voltage in such a manner that the ratio of the capacitance of a smoothing capacitor in a rectifying/smoothing circuit at the secondary output to an output current and the ratio of the capacitance of a smoothing capacitor in a rectifying/smoothing circuit of the detecting signal creating circuit to an output voltage are approximate values to each other.

[Means for Solving the Problems]

In order to solve the above problem, the high voltage generating apparatus for use in a toner system printing device according to this invention is applied to a high voltage generating apparatus for use in a toner system printing device comprising: a transformer wound by a primary coil, a secondary coil and an auxiliary coil; a transistor for oscillation with a collector connected to the primary coil and a base connected to the one terminal of the auxiliary coil, the transistor performing self-excited oscillation within a non-saturated range; a rectifying/smoothing circuit for rectifying/smoothing an output from the secondary coil to create an secondary output; a detecting signal creating circuit for rectifying/smoothing an output from a voltage detecting coil to create a voltage detecting signal indicative of a voltage of the secondary output; and a voltage control circuit for supplying a DC voltage control signal created on the basis of the voltage detecting signal to the other terminal of the auxiliary coil, wherein the voltage control circuit controls the oscillating amplitude of the transistor using the DC voltage control signal to stabilize the voltage of the secondary output, and the secondary output is led to a high voltage applying portion of a toner system printing section, and is designed so that the detecting signal creating circuit rectifies the output from the voltage detecting coil at the same timing as the rectifying/smoothing circuit rectifies the output from the secondary coil.

Specifically, where the output from the secondary coil and the output from the voltage detecting coil are rectified at the same timing, even when the degree of distortion varies in the self-excited oscillation, the ratio of the rectified/smoothed voltage (voltage of the secondary output) of the output from the secondary coil to the rectified/smoothed voltage (voltage of the voltage detecting signal) of the output from the voltage detecting coil does not vary. For this reason, the voltage accuracy at the secondary output is improved.

In addition to the above configuration, this invention is applied to a high voltage generating apparatus for use in a toner system printing device in which the rectifying/smoothing circuit is a double-voltage rectifying circuit, and is designed that the detecting signal creating circuit is a double-voltage rectifying circuit or a full-wave rectifying circuit.

Specifically, the output from the detecting signal creating circuit is a full-wave rectified output of the voltage detecting coil. Therefore, the output from the detecting signal creating circuit is an output rectified at the same timing as the rectifying/smoothing circuit performs rectification. Thus, even when the degree of distortion varies in the self-excited oscillation, the ratio of the rectified/smoothed voltage (voltage of the secondary output) of the output from the secondary coil to the rectified/smoothed voltage (voltage of the voltage detecting signal) of the output from the voltage detecting coil does not vary. For this reason, the voltage accuracy at the secondary output is improved.

In addition to the above configuration, assuming that the voltage drop value at the secondary output which is generated by a forward voltage of a rectifying element of the rectifying/smoothing circuit is a first drop value and that the voltage drop value of the voltage detecting signal which is generated by a forward voltage of a rectifying element of the detecting signal creating circuit is a second drop value, the ratio of the first drop value to the second drop value is made approximate to the ratio of the number of turns of the secondary coil to the number of turns of the voltage detecting coil.

Namely, the ratio of the forward voltage of the diode to the output voltage from the secondary coil and the ratio of the forward voltage of the diode to the output voltage from the voltage detecting coil take approximate values to each other. Therefore, the ratios of the influence of the forward voltage which varies according to a temperature to the voltages of the rectified outputs are substantially equal to each other. Thus, even when the forward voltage varies, the voltage of the secondary output to the voltage of the voltage detecting signal does not vary.

In addition to the above configuration, this invention is applied to a high voltage generating apparatus for use in a toner system printing device, in which the detecting signal creating circuit is a double voltage rectifying circuit, and is designed so that the ratio of the current value at the secondary output to the capacitance of a smoothing capacitor in the rectifying/smoothing circuit is made approximate to the ratio of a rectified output current value in the detecting signal creating circuit to the capacitance of a smoothing capacitor in the detecting signal creating circuit.

Namely, the ratio of the voltage of the secondary output to the output voltage from the secondary coil is approximate to the ratio of the voltage of the voltage detecting signal to the output voltage from the voltage detecting coil. Therefore, the ratios of the influence of the forward voltage which varies according to a temperature to the secondary output and the voltage detecting signal takes more approximate values to each other. Thus, even when the forward voltage varies, the ratio of the voltage of the secondary output to the voltage of the voltage detecting signal is maintained at the approximate values.

DETAILED DESCRIPTION OF THE PREFERRED EMBODIMENTS

[Mode for Carrying Out the Invention]

Figure 1:
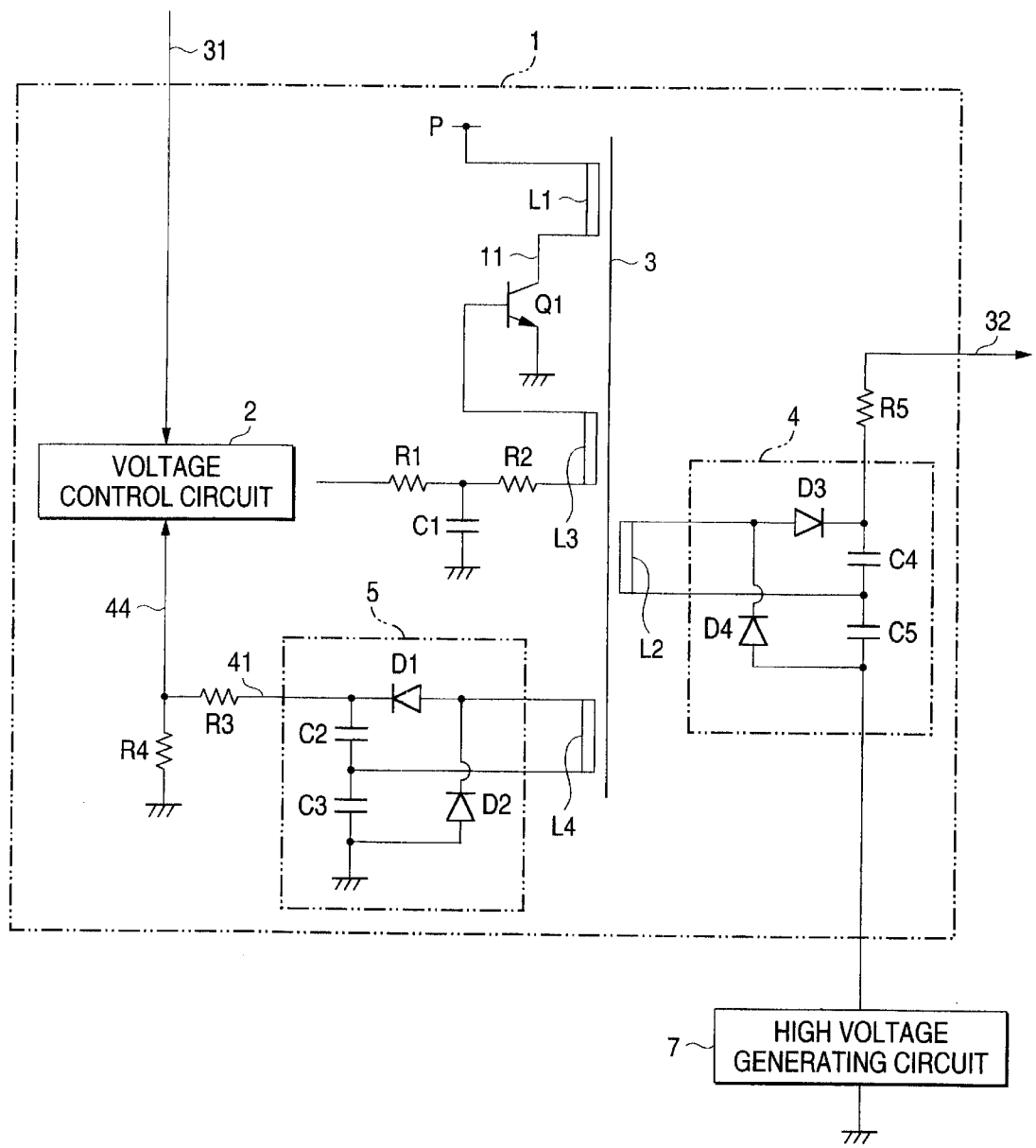
FIG. 1 is a circuit diagram of an electric connection of an embodiment of a high voltage generating apparatus for use in a toner system printing device according to this invention.

Referring to the drawings, an explanation will be given of an embodiment of this invention.

FIG. 1 is a circuit diagram showing an electric connection of an embodiment of the high voltage generating apparatus for use in a toner system printing device according to an embodiment of this invention. This electric connection can vary an output voltage continuously within a range of −1300 V to 2700 V (the other voltage range may be set).

In FIG. 1, a high voltage generating circuit 1 is adapted to vary the voltage at a secondary output continuously according to the duty ratio of a PWM signal 31. Namely, when the duty ratio of the PWM signal varies within a prescribed range, the voltage of the secondary output varies within a range of 700 V to 4700 V. On the other hand, a high voltage generating circuit 7 is also adapted to generate a high voltage stabilized at −2000 V. The secondary output of the high voltage generating circuit 1 is connected in series to that of the high voltage generating circuit 7. The output from this series connection is led, as a high voltage output 32, to a high voltage applying portion of a toner system printing section.

Figure 3:
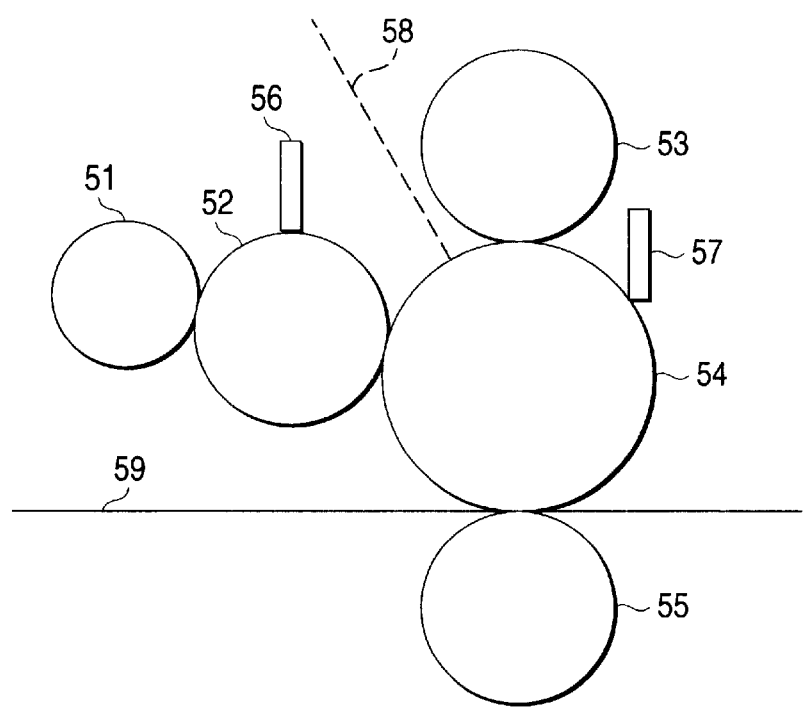
FIG. 3 is a schematic diagram of a toner system printing section.
Figure 4:
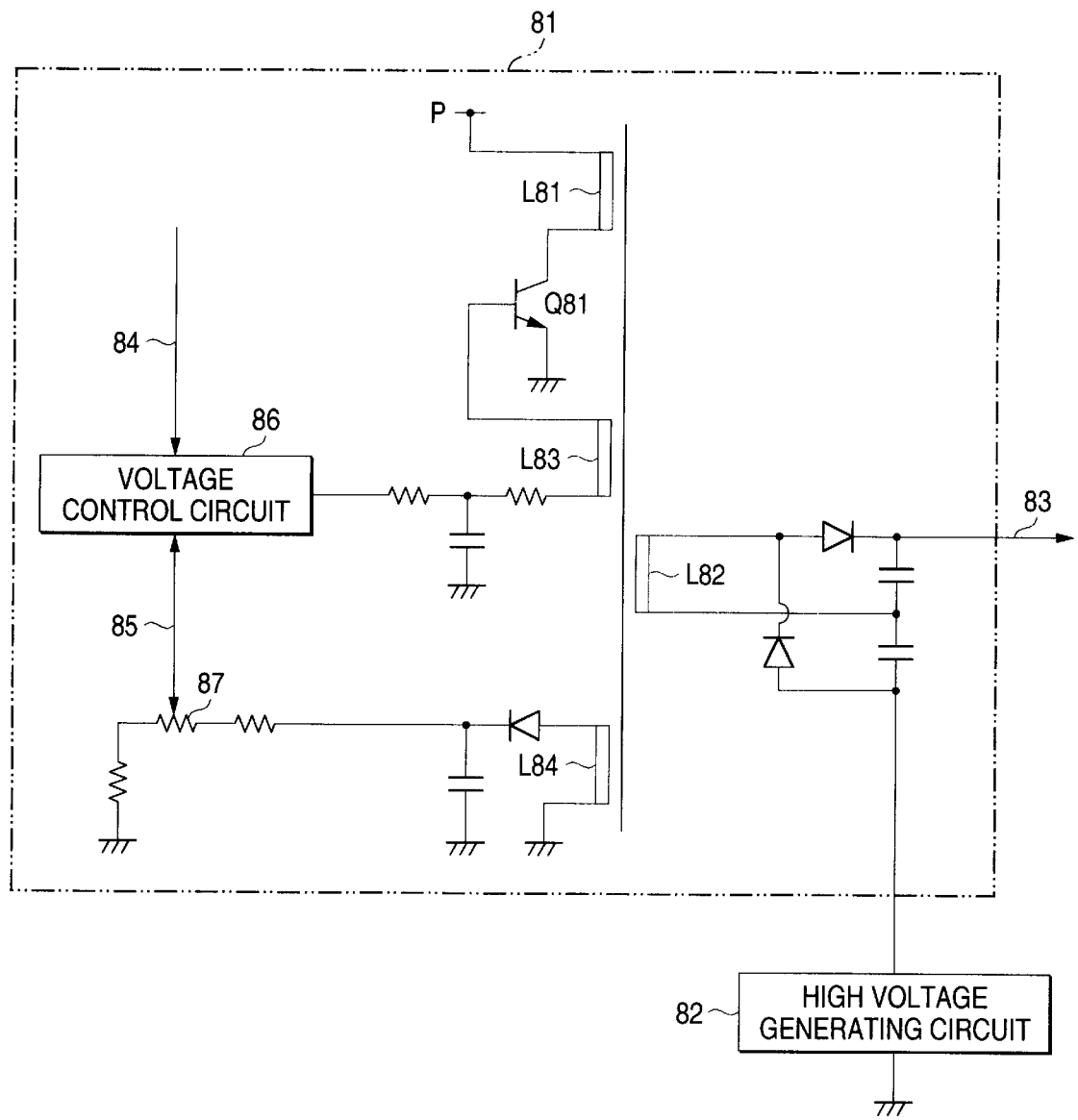
FIG. 4 is a circuit diagram showing an electric connection of a prior art.

FIG. 3 is a view for schematically explaining a toner system printing section.

The toner system printing section includes a toner roller 51, a developing roller 52, a charging roller 53, a photosensitive drum 54, a duplicating roller 55, a doctor blade 56 and a cleaner blade 57. In FIG. 1, the high voltage output 32 is applied to the duplicating roller 55. Incidentally, reference numeral 58 denotes laser light and reference numeral 59 denotes a printing sheet of paper.

Again, referring to FIG. 1, a detailed explanation will be given of the high voltage generating circuit. A transformer 3 is wounded by four kinds of coils, i.e. a primary coil L1, a secondary coil L2, an auxiliary coil L3, and a voltage detecting coil L4. The one terminal of the primary coil L1 is connected to a plus power source P of e.g. 20 V.

A transistor for oscillation (hereinafter simply referred to "transistor") Q1, which has a corrector connected to the other terminal of the primary coil L1, a base connected to the one terminal of the auxiliary coil L3 and an emitter connected to ground is an element capable of self-excited oscillation using a magnetic connection formed between the primary coil L1 and auxiliary coil L3 as a feedback passage. In this case, the transistor Q1 operates within a non-saturated range.

A detected signal creating circuit 5 is a block which creates s voltage detected signal 41 indicative of the voltage of the secondary output by rectifying/smoothing (specifically, double-voltage rectifies) the output from the voltage detecting coil L4. For this purpose, the detected signal creating circuit 5 includes diodes D1, D2, and capacitors C2, C3. Namely, the diodes D1, D2 and the capacitor C2, C3 serve to double-voltage rectify the output from the voltage detecting coil L4. These elements send the double-voltage rectified output to the one terminal of a resistor R3 as a voltage detecting signal 41. Resistors R3 and R4 constitute a voltage dividing circuit which divides the voltage detected signal 41 into a voltage adapted to the voltage control circuit 2.

A rectifying/smoothing circuit 4 is a block which double-voltage rectifies the output from the secondary coil L2 using the diodes D3, D4 and capacitors C4, C5. A resistor R5 inserted in the path of the high voltage output 32 is an element which prevents deterioration of the capacitors C4, C5 by limiting the current when the high voltage output 32 is short-circuited.

A capacitor C1 connected between a junction point of resistors R1 and D2 and a ground level is an element which connects the other terminal of the auxiliary coil L3 to ground in an AC mode. The resistor R1 is an element which limits the base current of the transistor Q1. The resistor R2 is an element which suppresses reduction in the impedance which constitutes load to the auxiliary coil L3 when a base current flows through the transistor Q1 (The resistor R2 can be located between the one terminal of the auxiliary coil L3 and the base of the transistor Q1).

A voltage control circuit 2 is a block which supplies a DC voltage detecting signal, which has been created on the basis of the divided voltage detecting signal 44 (hereinafter simply referred to as "voltage detecting signal") and the PWM signal 31, to the other terminal of the auxiliary coil L3 via the resistors R1 and R2. The voltage control circuit 2 controls the oscillating amplitude of the transistor Q1 using the voltage control signal to stabilize the voltage of the secondary output (output from the rectifying/smoothing circuit) to a voltage represented by the PWM signal 31.

Specifically, the voltage control circuit 2 controls the oscillating amplitude of the transistor Q1 so that the voltage of the voltage detecting signal 44 becomes a voltage corresponding to the PWM signal 31. As a result, the voltage of the secondary output is stabilized to the voltage specified by the PWM signal 31. This means that where the voltage of the voltage detecting signal 41 precisely corresponds to the voltage of the secondary output, the voltage accuracy at the secondary output is improved, and where the voltage of the voltage detecting signal 41 does not precisely correspond to the voltage of the secondary output, the voltage accuracy at the secondary output is deteriorated.

On the other hand, the detecting signal creating circuit 5 rectifies the output from the voltage detecting coil L4 (for both periods t1 and t2 in FIG. 2) at the same timing as the rectifying/smoothing circuit 4 rectifies the output from the secondary coil L2. Therefore, even when the self-excited oscillation generates distortion, irrespectively of the degree of the distortion, the voltage of the voltage detecting signal 41 precisely corresponds to the voltage of the secondary output. Thus, even when the degree of distortion varies in the self-excited oscillation of the transistor Q1, the ratio of the rectified/smoothed voltage (voltage of the secondary output) of the output from the secondary coil L2 to the rectified/smoothed voltage (voltage of the voltage detecting signal 41) of the output from the voltage detecting coil L4 does not vary. For this reason, the voltage of the secondary output can be controlled precisely at all times.

An explanation will be given of the relationship between the number of turns of the secondary coil L2 and the number of turns of the voltage detecting coil L4.

The forward voltages of the diodes D3 and D4 in the rectifying/smoothing circuit 4 are 30 V, respectively. Therefore, the voltage drop in the voltage of the secondary output (which refers to a first voltage drop value in claims, and hereinafter referred to as VF2) is 60 V. Further, the forward voltages of the diodes D1 and D2 in the detecting signal creating circuit 5 are 0.65 V, respectively. Therefore, the voltage drop in the voltage of the voltage detecting signal 41 (which refers to a second voltage drop value in claims, and hereinafter referred to as VF4) is 1.3 V.

Now, assuming that value n is represented by (n=VF2/VF4), and the number of turns of the secondary coil L2 is T2, the number of turns of the voltage detecting coil L4 is set at the number of turns represented by (T4=T2/n). Namely, the ratio of VF2 to VF4 (VF2/VF4) and the ratio of the number of turns of the secondary coil L2 to the number of turns of the voltage detecting coil L4 are both set at n.

On the other hand, the temperature characteristics of the diodes D1 and D2 and those of the diodes D3 and D4 are all substantially equal to one another. Therefore, as long as all the diodes D1 to D4 are located at the approximate temperatures, even when the environmental temperature varies, (VF2=n×VF4) Further, the relationship between the output voltage VL2 of the secondary coil L2 and the output voltage VL4 of the voltage detecting coil L4 is (VL2=n×VL4).

The relationship between the output voltage VL2 from the secondary coil L2 and the voltage of the second output varies according to the ratio of the output current to the capacitances of the capacitors C4 and C5. The relationship between the output voltage VL4 from the voltage detecting coil L4 and voltage of the voltage detecting signal 41 also varies according to the ratio of the output current (current flowing through the resistor R3) to the capacitances of the capacitors C2 and C3. These relationships also varies when the oscillation of the transistor Q1 generates distortion.

In view of the facts described above, for simplicity of explanation, it is assumed that the oscillation of the transistor Q1 initially contains no distortion. With the forward voltage being 0 V, it is assumed that the voltages rectified by the diodes D1 and D2 are equal to the output from the voltage detecting coil L4 and the voltages rectified by the diodes D3 and D4 are equal to the output voltage VL2 from the secondary coil L2.

On the above assumption, the voltage Vout2 of the secondary output is (Vout2=2×VL2−VF2). Therefore, the voltage Vout2 is represented by (Vout2=n×2×VL4−n×VF4), i.e. (Vout2=n×(2×VL4−VF4)). On the other hand, the voltage Vout4 of the voltage detecting signal 41 is represented by (Vout4=2×VL4−VF4). Therefore, even when the environmental temperature varies, the voltage Vout2 of the secondary output is n times as large as the voltage Vout4. As a result, if the voltage control circuit 2 controls the oscillating amplitude of the transistor Q1 so that the voltage Vout4 of the voltage detecting signal 41 is constant, even when the environmental temperature varies, the voltage Vout2 at the secondary output is controlled to be n times as large as the voltage Vout4 of the voltage detecting signal 41 irrespectively of a change in the environmental temperature.

Figure 2:
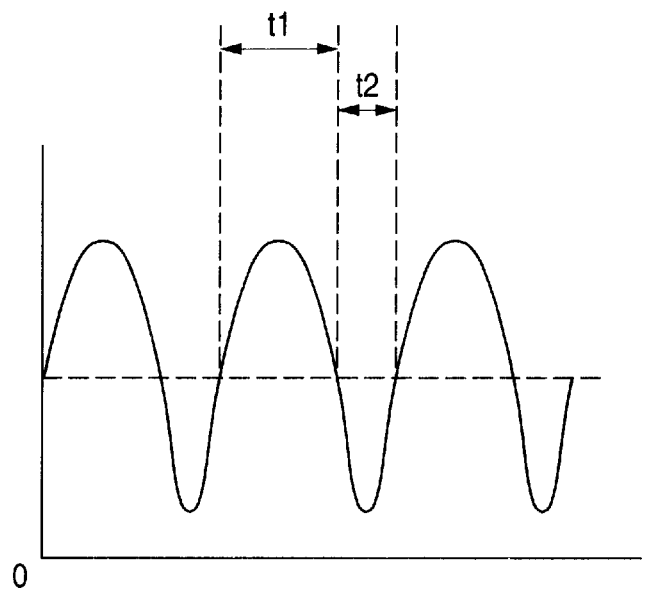
FIG. 2 is a graph showing of an oscillating waveform of a transistor when distortion is generated.

Now referring to FIG. 2 (showing the waveform of a path 11), an explanation will be given of the case where the oscillation of the transistor Q1 generates distortion.

Where the oscillation of the transistor Q1 has distortion, the voltage rectified during period t1 and the voltage rectified during period t2 have different absolute voltages. On the other hand, the rectifying/smoothing circuit 4 performs double-voltage rectification. The detecting signal creating circuit 5 also performs the double-voltage rectification. Therefore, the rate of the influence of the above distortion given to the secondary output is equal to that given to the voltage of the voltage detecting signal 41. Therefore, when any distortion is included in the oscillation of the transistor Q1, the voltage of the secondary output is n times as large as the voltage of the voltage detecting signal 41. As a result, event when the distortion is included in the oscillation of the transistor Q1, the voltage Vout2 of the secondary output is controlled to be n times as large as the voltage Vout4 of the voltage detecting signal 41. Namely, the voltage of the secondary output is stabilized to the voltage directed by the PWM signal.

Further, the capacitances of the capacitors C2 to C5 are set so that the ratio of the capacitances of the capacitors C4 and C5 in the rectifying/smoothing circuit 4 to the output current of the rectifying/smoothing circuit 4 is approximate to the ratio of the capacitances of the capacitors C2 and C3 in the detecting signal creating circuit 5 to the current flowing through the resistor R3. In such settings, the ratio of the output voltage VL2 at the secondary coil L2 to the output voltage Vout2 from the rectifying/smoothing circuit 4 is approximate to the ratio of the output voltage VL4 from the voltage detecting coil L4 to the voltage Vout4 of the voltage detecting signal 41. Therefore, the value represented by (Vout2/Vout4) exhibits the value more approximate to the above value n.

Therefore, taking it account into consideration that the relationship between the output voltage VL2 from the secondary coil L2 and the voltage Vout2 at the secondary output is varied according to the ratio of the output current to the capacitances of the capacitors C4 and C5, and the relationship between the output voltage VL4 from the voltage detecting coil L4 and the voltage Vout4 of the voltage detecting signal 41 is varied according to the ratio of the output current (current flowing through the resistor R3) to the capacitances of the capacitances of the capacitors C2 and C3, the voltage Vout2 of the secondary output is more approximate to the voltage Vout4 of the voltage detecting signal 41. Thus, the voltage accuracy at the secondary output is improved more greatly.

Incidentally, this invention should not be limited to the above embodiment. For example, the manner of rectifying in the detecting signal creating circuit 5 may be full-wave rectification using a diode bridge (In this case, the second voltage drop is equal to the forward voltage of the individual elements in the diode bridge. Therefore, the number of turns of the voltage detecting coil L4 is half as large as in the case of the double-voltage rectification).

In the above embodiment, the rectifying/smoothing circuit for rectifying/smoothing the output from the secondary coil L2 was explained as the double voltage rectifying circuit. However, this rectifying/smoothing circuit may be a half-wave rectifying/smoothing circuit (In this configuration, the rectifying/smoothing circuit for rectifying/smoothing the output from the voltage detecting coil L4 is also a half-wave rectifying/smoothing circuit. In addition, when a current flows through the diode of the half-wave rectifying/smoothing circuit corresponding to the secondary coil L2, its polarity is set to permit the current to flow the diode of the half-wave rectifying/smoothing circuit corresponding to the voltage detecting coil L4).

[Effect of the Invention]

As described above, the high voltage generating apparatus for use in a toner system printing device according to this invention is designed so that the detecting signal creating circuit rectifies the output from the voltage detecting coil at the same timing as the rectifying/smoothing circuit rectifies the output from the secondary coil. Thus, even when the degree of distortion varies in the self-excited oscillation, the ratio of the voltage of the secondary output obtained by rectifying/smoothing the output from the secondary coil to the voltage of the voltage detecting signal obtained by rectifying/smoothing the output from the voltage detecting coil does not vary. For this reason, the adverse effect of the distortion of the self-excited oscillation on the voltage accuracy at the secondary output is eliminated so that the voltage accuracy at the secondary output is improved, thereby enhancing the printing quality.

Further, this invention is applied to a high voltage generating apparatus for use in a toner system printing device in which the rectifying/smoothing circuit is a double-voltage rectifying circuit, and is designed so that the detecting signal creating circuit is a double-voltage rectifying circuit is a double-voltage rectifying circuit or a full-wave rectifying circuit. Therefore, the output from the detecting signal creating circuit is an output rectified at the same timing as the rectifying/smoothing circuit performs rectification. Thus, even when the output from the secondary coil is double-voltage rectified, the adverse effect of the distortion of the self-excited oscillation on the voltage accuracy of the secondary output is eliminated, and hence the voltage accuracy at the secondary output is improved, thereby enhancing the printing quality.

Further, assuming that the voltage drop value at the secondary output which is generated by a forward voltage of a rectifying element of the rectifying/smoothing circuit is a first drop value and that the voltage drop value of the voltage detecting signal which is generated by a forward voltage of a rectifying element of the detecting signal creating circuit is a second drop value, the ratio of the first drop value to the second drop value is made approximate to the ratio of the number of turns of the secondary coil to the number of turns of the voltage detecting coil. Therefore, the ratios of the influence of the forward voltage which varies according to a temperature to the voltage of the rectified outputs are substantially equal to each other. Thus, even when the forward voltage varies, the voltage of the secondary output to the voltage of the voltage detecting signal does not vary. Accordingly, the voltage accuracy at the secondary output which is attributable to a change in the forward voltage of the rectifying element can be prevented from being reduced.

In addition to the above configuration, this invention is applied to a high voltage generating apparatus for use in a toner system printing device, in which the detecting signal creating circuit is a double voltage rectifying circuit, and is designed so that the ratio of the current value at the secondary output to the capacitance of a smoothing capacitor in the rectifying/smoothing circuit is made approximate to the ratio of a rectified output current value in the detecting signal creating circuit to the capacitance of a smoothing capacitor in the detecting signal creating circuit.

Therefore, the ratios of the influence of the forward voltage which varies according to a temperature to the secondary output and the voltage detecting signal takes more approximate values to each other. Thus, even when the forward voltage varies, the ratio of the voltage of the secondary output to the voltage of the voltage detecting signal is maintained at the approximate values, thereby enhancing the output voltage accuracy.

What is claimed is:

1. A high voltage generating apparatus for use in a toner system printing device comprising:

a transformer wound by a primary coil, a secondary coil and an auxiliary coil;

a transistor for oscillation with a collector connected to said primary coil and a base connected to the one terminal of said auxiliary coil, said transistor performing self-excited oscillation within a non-saturated range;

a rectifying/smoothing circuit for rectifying/smoothing an output from said secondary coil to create an secondary output;

a detecting signal creating circuit for rectifying/smoothing an output from a voltage detecting coil to create a voltage detecting signal indicative of a voltage of the secondary output; and a voltage control circuit for supplying a DC voltage control signal created on the basis of the voltage detecting signal to the other terminal of said auxiliary coil, wherein said voltage control circuit controls the oscillating amplitude of said transistor using the DC voltage control signal to stabilize the voltage of the secondary output, the secondary output is led to a high voltage applying portion of a toner system printing section, and said detecting signal creating circuit rectifies the output from said voltage detecting coil at the same timing as said rectifying/smoothing circuit rectifies the output from said secondary coil.

2. The high voltage generating apparatus for use in a toner system printing device according to claim 1, wherein said rectifying/smoothing circuit is double-voltage rectifying circuit, and said detecting signal creating circuit is a double-voltage rectifying circuit or a full-wave rectifying circuit.

3. The high voltage generating apparatus for use in a toner system printing device according to claim 1, wherein assuming that the voltage drop value of said secondary output which is generated by a forward voltage of a rectifying element of said rectifying/smoothing circuit is a first drop value, and that the voltage drop value of said voltage detecting signal which is generated by a forward voltage of a rectifying element of said detecting signal creating circuit is a second drop value, the ratio of said first drop value to said second drop value and the ratio of the number of turns of said secondary coil to the number of turns of said voltage detecting coil are approximate values to each other.

4. The high voltage generating apparatus for use in a toner system printing device according to claim 3, wherein said detecting signal creating circuit is a double voltage rectifying circuit, and the ratio of the current value at the secondary output to the capacitance of a smoothing capacitor in said rectifying/smoothing circuit and the ratio of a rectified output current value in said detecting signal creating circuit to the capacitance of a smoothing capacitor in said detecting signal creating circuit are approximate values to each other.

* * * * *